US010951805B2

(12) United States Patent
Kawatani et al.

(10) Patent No.: US 10,951,805 B2
(45) Date of Patent: Mar. 16, 2021

(54) IMAGE GENERATING APPARATUS AND IMAGE GENERATING METHOD

(71) Applicant: HONDA MOTOR CO., LTD., Tokyo (JP)

(72) Inventors: Takeshi Kawatani, Wako (JP); Kota Nakauchi, Wako (JP); Ken Iihoshi, Wako (JP); Kimihiro Yonekawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/567,526

(22) Filed: Sep. 11, 2019

(65) Prior Publication Data

US 2020/0007742 A1    Jan. 2, 2020

Related U.S. Application Data

(63) Continuation of application No. PCT/JP2017/013523, filed on Mar. 31, 2017.

(51) Int. Cl.
*H04N 5/262* (2006.01)
*H04N 7/18* (2006.01)
*H04N 5/232* (2006.01)

(52) U.S. Cl.
CPC ..... *H04N 5/23203* (2013.01); *H04N 5/23299* (2018.08); *H04N 5/262* (2013.01); *H04N 7/18* (2013.01)

(58) Field of Classification Search
CPC .................................................. H04N 5/23203
See application file for complete search history.

(56) References Cited

U.S. PATENT DOCUMENTS

| 6,233,523 B1 * | 5/2001 | Sood ....................... G01C 15/00 348/118 |
| 6,862,524 B1 * | 3/2005 | Nagda ................. G01C 21/3492 340/988 |
| 6,895,126 B2 * | 5/2005 | Di Bernardo ...... G01C 21/3848 382/284 |

(Continued)

FOREIGN PATENT DOCUMENTS

| CN | 103226575 A | 7/2013 |
| CN | 104317932 A | 1/2015 |

(Continued)

OTHER PUBLICATIONS

International Search Report for PCT/JP2017/013523 dated Jun. 20, 2017 (partially translated).

(Continued)

*Primary Examiner* — Irfan Habib
(74) *Attorney, Agent, or Firm* — Thomas Horstemeyer, LLP (57) ABSTRACT

An image generating apparatus comprises a first obtaining unit configured to obtain a geographical position for which an image is to be generated, a second obtaining unit configured to specify date and time when a target vehicle traveled through the geographical position in a past and obtain travel data of the vehicle at the date and time; and a generating unit configured to generate a travel image including a scene of the geographical position and the travel data.

13 Claims, 8 Drawing Sheets

(56) References Cited

U.S. PATENT DOCUMENTS

| | | | |
|---|---|---|---|
| 7,233,233 B2* | 6/2007 | Taniguchi | G06K 9/00362 |
| | | | 340/435 |
| 7,386,394 B2* | 6/2008 | Shulman | G01C 11/00 |
| | | | 340/995.22 |
| 7,797,019 B2* | 9/2010 | Friedmann | G06F 16/248 |
| | | | 455/556.1 |
| 7,876,205 B2* | 1/2011 | Catten | H04W 48/04 |
| | | | 340/439 |
| 8,255,393 B1* | 8/2012 | Yu | H04W 4/029 |
| | | | 707/724 |
| 9,067,565 B2* | 6/2015 | McClellan | G07C 5/0841 |
| 9,129,460 B2* | 9/2015 | McClellan | G07C 5/008 |
| 9,137,498 B1* | 9/2015 | L'Heureux | H04N 7/18 |
| 9,256,986 B2* | 2/2016 | Kasahara | G06T 19/006 |
| 9,552,844 B2* | 1/2017 | Fujimoto | G11B 27/3027 |
| 10,549,853 B2* | 2/2020 | Jiang | G05D 1/0038 |
| 2009/0015685 A1* | 1/2009 | Shulman | G06T 19/00 |
| | | | 348/222.1 |
| 2011/0063432 A1* | 3/2011 | Di Bernardo | G01C 11/02 |
| | | | 348/116 |
| 2012/0131065 A1* | 5/2012 | Park | G06F 16/435 |
| | | | 707/805 |
| 2014/0278086 A1* | 9/2014 | San Filippo | G01C 21/3492 |
| | | | 701/527 |
| 2019/0250276 A1* | 8/2019 | Arnold | G01S 19/27 |
| 2020/0004909 A1* | 1/2020 | Emond | G09B 9/04 |

FOREIGN PATENT DOCUMENTS

| | | |
|---|---|---|
| CN | 104750848 A | 7/2015 |
| JP | 2002-290963 A | 10/2002 |
| JP | 2004-064511 A | 2/2004 |
| JP | 2005-217521 A | 8/2005 |
| JP | 2006-174124 A | 6/2006 |
| JP | 4121973 B2 | 7/2008 |
| JP | 2009-212701 A | 9/2009 |
| JP | 2012-133023 A | 7/2012 |
| JP | 2013257804 A | 12/2013 |
| WO | 2018/179312 A1 | 10/2018 |

OTHER PUBLICATIONS

IPRP for PCT/JP2017/013523 mailed Feb. 13, 2018.
Office Action for Chinese Patent Application No. 201780088455.5. dated Sep. 2, 2020. (partial translation).

* cited by examiner

IMAGE GENERATING APPARATUS AND IMAGE GENERATING METHOD

CROSS-REFERENCE TO RELATED APPLICATION

This application is a continuation of International Patent Application No. PCT/JP2017/013523 on Mar. 31, 2017, the entire disclosures of which is incorporated herein by reference.

TECHNICAL FIELD

The present invention relates to an image generating apparatus and an image generating method.

BACKGROUND ART

In recent years, vehicles that are equipped with cameras for shooting the surroundings are increasing in number. According to the description of PTL 1, when another vehicle and a fixed camera exist around a self-vehicle, shot data is obtained by requesting them to shoot the self-vehicle.

CITATION LIST

Patent Literature

PTL 1: Japanese Patent Laid-Open No. 2009-212701

SUMMARY OF INVENTION

Technical Problem

With the technique described in PTL 1, images shot by another vehicle or the fixed camera are automatically transmitted to the self-vehicle. This makes it difficult for a user of the self-vehicle to specify an image shot at a specific geographical position. An aspect of the present invention aims to facilitate the specification of an image of a vehicle that was shot at a specific geographical position.

Solution to Problem

Some embodiments of the present invention provides an image generating apparatus comprising: a first obtaining unit configure to obtain a geographical position for which an image is to be generated; a second obtaining unit configured to specify date and time when a target vehicle traveled through the geographical position in a past and obtain travel data of the vehicle at the date and time; and a generating unit configured to generate a travel image including a scene of the geographical position and the travel data.

Advantageous Effects of Invention

According to the aforementioned means, the specification of an image of a vehicle that was shot at a specific geographical position is facilitated.

BRIEF DESCRIPTION OF DRAWINGS

The attached drawings are included in and constitute a part of the specification, illustrate embodiments of the present invention, and are used together with the description thereof to explain the principle of the present invention.

DESCRIPTION OF EMBODIMENTS

Embodiments of the present invention will be described below with reference to the attached drawings. The same reference numerals denote like components throughout various embodiments, and duplicate explanations are omitted. Also, each embodiment can be changed and combined as appropriate. Although the following embodiments handle a two-wheeled motor vehicle (so-called motorbike) as one example of a vehicle, the vehicle may be a four-wheeled motor vehicle or may be another vehicle.

Figure 1:
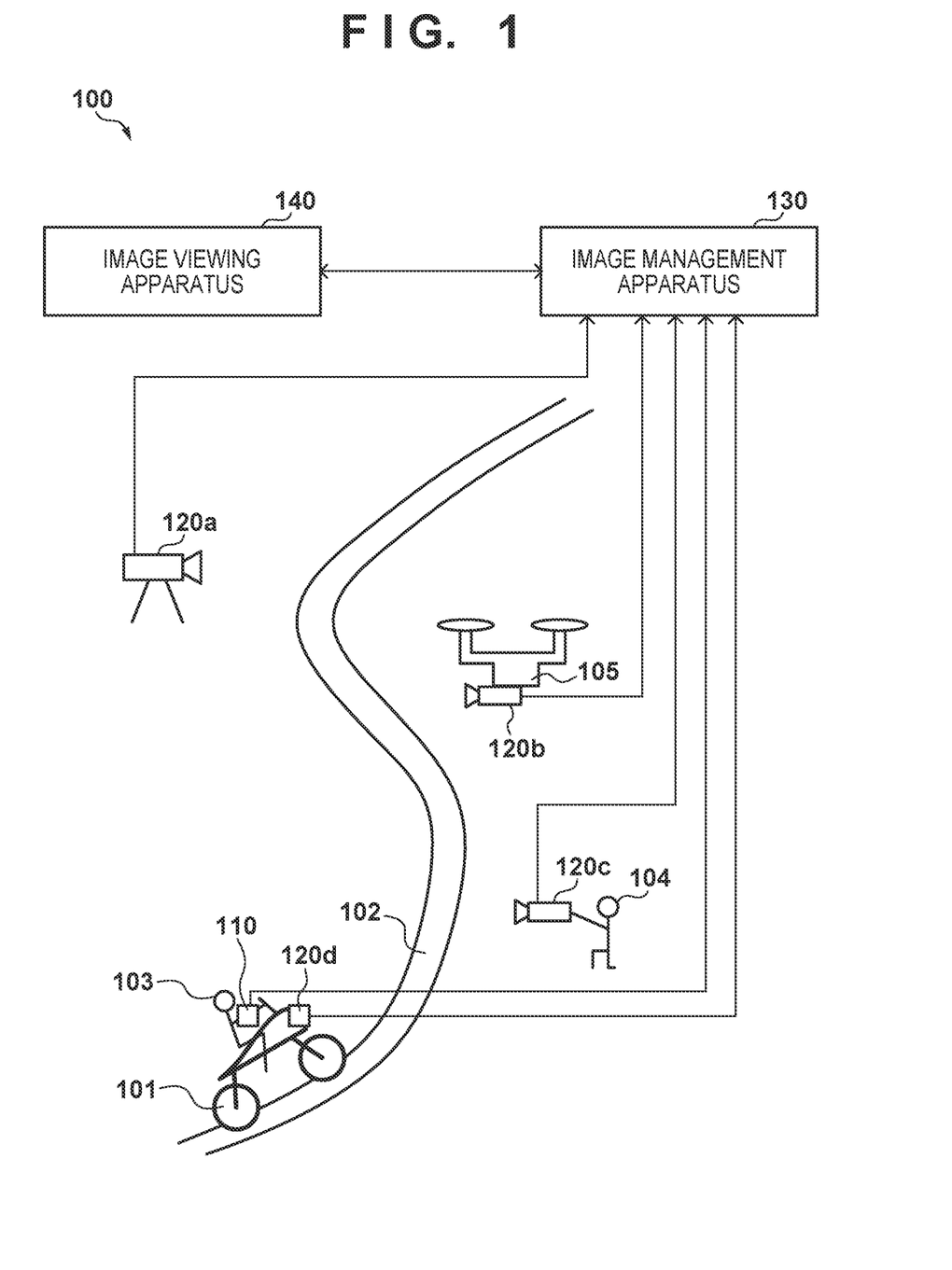
FIG. 1 is a diagram for describing an exemplary configuration of an image providing system according to embodiments of the present invention.

With reference to FIG. 1, a description is now given of an exemplary configuration and an outline of operations of an image providing system 100 according to some embodiments. The image providing system 100 includes a position obtaining apparatus 110, shooting apparatuses 120*a* to 120*d*, an image management apparatus 130, and an image viewing apparatus 140.

The position obtaining apparatus 110 is an apparatus that obtains a current geographical position of a vehicle 101 driven by a driver 103. The position obtaining apparatus 110 moves together with the travelling vehicle 101. The position obtaining apparatus 110 transmits obtained position information of the vehicle 101 to the image management apparatus 130. The position obtaining apparatus 110 may be mounted on the vehicle 101, or may be held by the driver 103. When the position obtaining apparatus 110 is held by the driver 103, the position obtaining apparatus 110 may be a mobile device, such as a smartphone.

Each of the shooting apparatuses 120a to 120d is an apparatus that shoots a travel road 102. The shooting apparatuses 120a to 120d are collectively referred to as the shooting apparatus(es) 120 when they need not be particularly distinguished from one another. The shooting apparatuses 120 transmit shot images to the image management apparatus 130. The images may be still images or may be moving images. The shooting apparatuses 120 may be fixed at a fixed position like the shooting apparatus 120a, may be mounted on an unmanned air vehicle 105 (e.g., a drone) that can fly independently like the shooting apparatus 120b, may be used by a photographer 104 like the shooting apparatus 120c, or may be mounted on the vehicle 101 like the shooting apparatus 120d. The unmanned air vehicle 105 and the vehicle 101 are both examples of a mobile object. The image providing system 100 may include at least one of the shooting apparatuses 120a to 120d, or may include more than one of each of the shooting apparatuses 120a to 120d.

The image management apparatus 130 is an apparatus that manages images of the vehicle 101. In the following embodiments, as the image management apparatus 130 generates a travel image, it can also be referred to as an image generating apparatus. The image viewing apparatus 140 is an apparatus that is intended for a user to view a travel image of the vehicle 101. Using the image viewing apparatus 140, the user requests the image management apparatus 130 to generate the travel image. In response, the image management apparatus 130 generates the travel image, and transmits the same to the image viewing apparatus 140. The image viewing apparatus 140 displays the received travel image on a display apparatus.

Figure 2A:
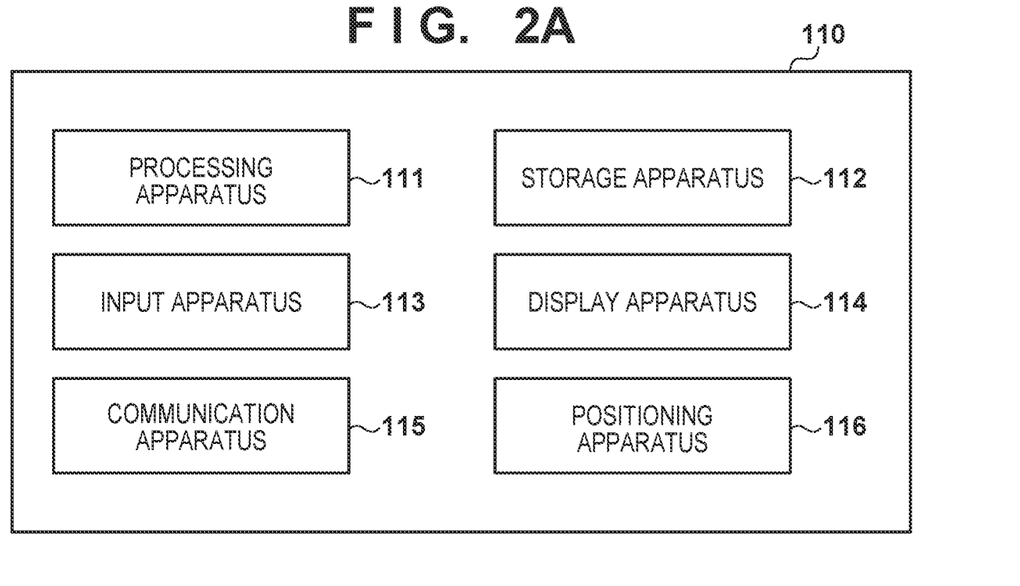
FIG. 2A is a diagram for describing an exemplary configuration of a position obtaining apparatus according to embodiments of the present invention.

With reference to FIGS. 2A to 2D, a description is now given of an exemplary hardware configuration of each apparatus included in the image providing system 100. As shown in FIG. 2A, the position obtaining apparatus 110 includes a processing apparatus 111, a storage apparatus 112, an input apparatus 113, a display apparatus 114, a communication apparatus 115, and a positioning apparatus 116. The processing apparatus 111 is an apparatus that executes processing performed by the position obtaining apparatus 110, and is constituted by, for example, a processor, such as a CPU. The storage apparatus 112 is an apparatus for storing data that is intended for processing performed by the position obtaining apparatus 110, and is constituted by, for example, a memory, such as a RAM and a ROM.

The input apparatus 113 is an apparatus for receiving input from a user of the position obtaining apparatus 110, and is constituted by, for example, a touchpad, buttons, etc. The display apparatus 114 is an apparatus for presenting information to the user of the position obtaining apparatus 110, and is constituted by, for example, a liquid crystal display, a speaker, etc. The input apparatus 113 and the display apparatus 114 may be constituted by an integrated apparatus, such as a touchscreen.

The communication apparatus 115 is an apparatus that is intended for the position obtaining apparatus 110 to perform communication with another apparatus; it is constituted by a network card and the like when wired communication is performed, and constituted by an antenna, a signal processing circuit, and the like when wireless communication is performed. The position obtaining apparatus 110 may perform wireless communication as it moves together with the vehicle 101. Alternatively, the position obtaining apparatus 110 may be connected to the vehicle 101 via a cable, and perform wired communication with a communication apparatus (not illustrated) of the vehicle 101. In this case, information from the position obtaining apparatus 110 is transmitted to the image management apparatus 130 by way of the communication apparatus of the vehicle 101.

The positioning apparatus 116 is an apparatus for measuring a current geographical position of the position obtaining apparatus 110, and is constituted by, for example, a GPS (Global Positioning System) receiver. As the position obtaining apparatus 110 moves together with the vehicle 101, a current geographical position of the position obtaining apparatus 110 could be considered as a current geographical position of the vehicle 101. In view of this, this geographical position is referred to as a vehicle position.

Figure 2B:
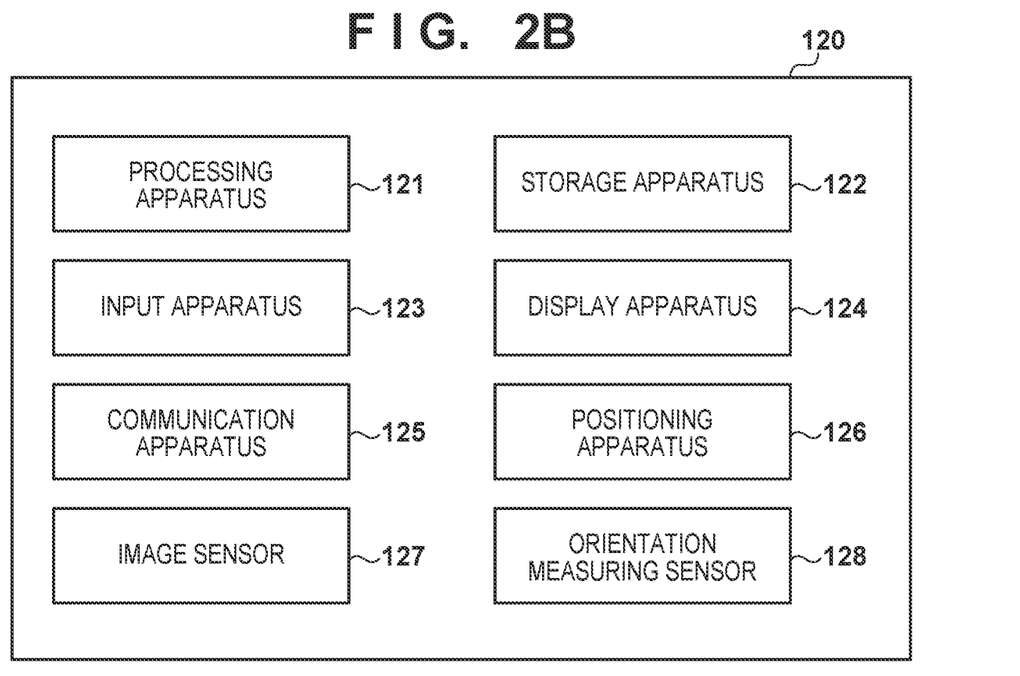
FIG. 2B is a diagram for describing an exemplary configuration of a shooting apparatus according to embodiments of the present invention.

As shown in FIG. 2B, the shooting apparatus 120 includes a processing apparatus 121, a storage apparatus 122, an input apparatus 123, a display apparatus 124, a communication apparatus 125, a positioning apparatus 126, an image sensor 127, and an orientation measuring sensor 128. As the processing apparatus 121, storage apparatus 122, input apparatus 123, display apparatus 124, communication apparatus 125, and positioning apparatus 126 are similar to the processing apparatus 111, storage apparatus 112, input apparatus 113, display apparatus 114, communication apparatus 115, and positioning apparatus 116, duplicate explanations are omitted.

The image sensor 127 is a sensor for generating an electrical signal based on light incident on the shooting apparatus 120. The processing apparatus 121 generates an image by processing the electrical signal generated by the image sensor 127.

The orientation measuring sensor 128 is a sensor for measuring an orientation (a direction and an inclination) of the shooting apparatus 120, and is, for example, a gyroscope. The processing apparatus 121 specifies a geographical position at which the shooting apparatus 120 is currently performing the shooting (hereinafter referred to as a shooting position) based on a geographical position of the shooting apparatus 120 measured by the positioning apparatus 126 and an orientation measured by the orientation measuring sensor 128. The shooting apparatus 120a, which is fixed at a fixed position, may not include the positioning apparatus 126 and the orientation measuring sensor 128. In this case, an installer of the shooting apparatus 120a may manually set a geographical position of a shooting area using the input apparatus 113. Similarly, the shooting apparatus 120c, which is used by the photographer 104, may not include the positioning apparatus 126 and the orientation measuring sensor 128. In this case, the photographer 104 may manually set a geographical position of a shooting area using the input apparatus 113.

Figure 2C:
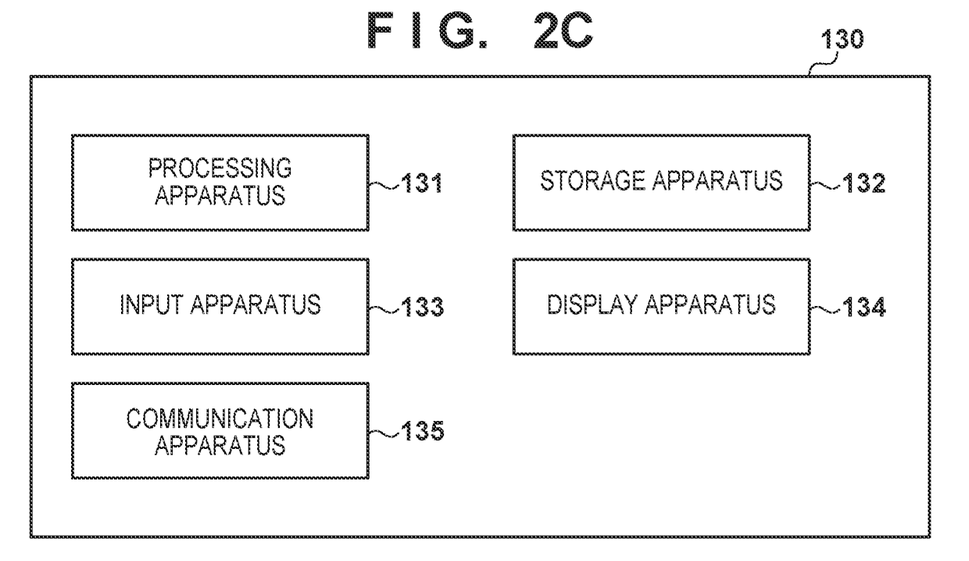
FIG. 2C is a diagram for describing an exemplary configuration of an image management apparatus according to embodiments of the present invention.

As shown in FIG. 2C, the image management apparatus 130 includes a processing apparatus 131, a storage apparatus 132, an input apparatus 133, a display apparatus 134, and a communication apparatus 135. As the processing apparatus 131, storage apparatus 132, input apparatus 133, display apparatus 134, and communication apparatus 135 are similar to the processing apparatus 111, storage apparatus 112, input apparatus 113, display apparatus 114, and communication apparatus 115, duplicate explanations are omitted. As the image management apparatus 130 processes a large amount of data, it is constituted by, for example, a computer for a server. Also, the storage apparatus 132 may be constituted by a disk apparatus and the like, in addition to a memory.

Figure 2D:
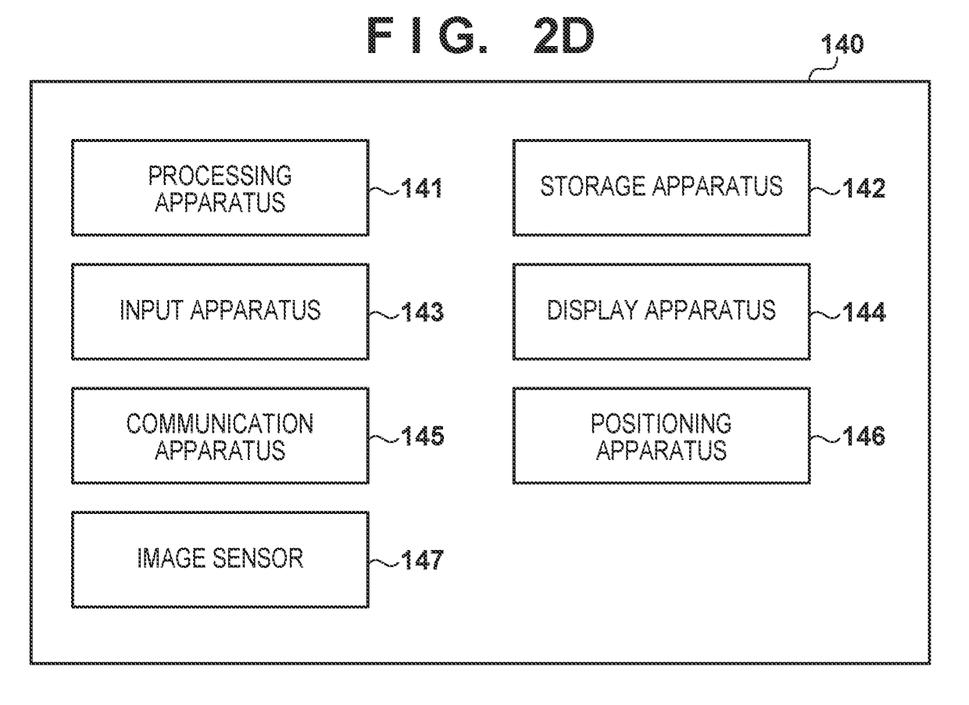
FIG. 2D is a diagram for describing an exemplary configuration of an image viewing apparatus according to embodiments of the present invention.

As shown in FIG. 2D, the image viewing apparatus 140 includes a processing apparatus 141, a storage apparatus 142, an input apparatus 143, a display apparatus 144, a communication apparatus 145, a positioning apparatus 146, and an image sensor 147. As the processing apparatus 141, storage apparatus 142, input apparatus 143, display apparatus 144, communication apparatus 145, positioning apparatus 146, and image sensor 147 are similar to the processing apparatus 111, storage apparatus 112, input apparatus 113, display apparatus 114, communication apparatus 115, positioning apparatus 116, and image sensor 127, duplicate explanations are omitted. The image processing apparatus 130 is, for example, a smartphone or a similar mobile apparatus, a personal computer, and so forth. The above-described position obtaining apparatus 110 may be used as the image viewing apparatus 140.

Figure 3:
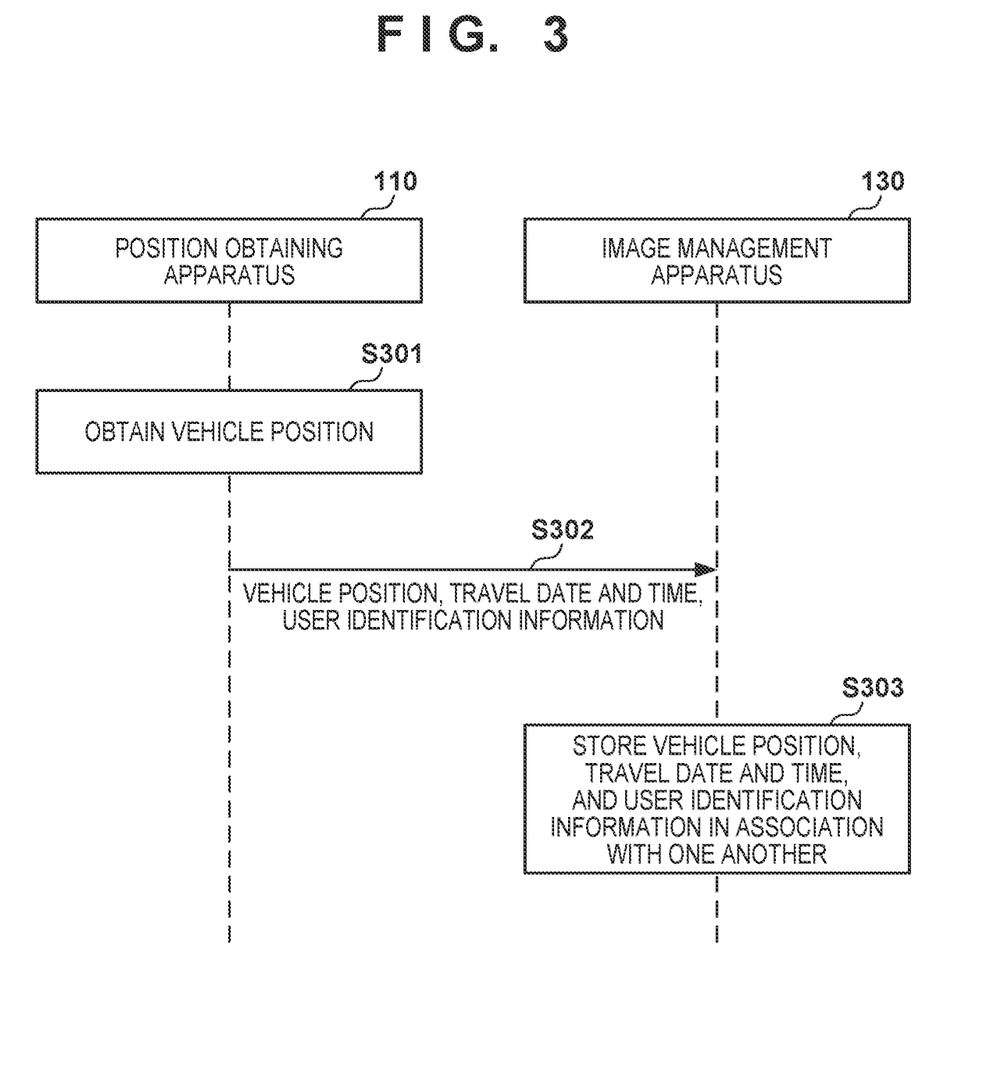
FIG. 3 is a diagram for describing one example of processing for registering a vehicle position according to embodiments of the present invention.

With reference to FIG. 3, a description is now given of one example of processing for registering a vehicle position of the vehicle 101. This processing is executed through collaboration between the position obtaining apparatus 110 and the image management apparatus 130. Processing in the position obtaining apparatus 110 is performed by the processing apparatus 111 reading out a program stored in the storage apparatus 112 and executing instructions included in this program. Processing in the image management apparatus 130 is performed by the processing apparatus 131 reading out a program stored in the storage apparatus 132 and executing instructions included in this program.

In step S301, the position obtaining apparatus 110 obtains a current vehicle position of the position obtaining apparatus 110 using the positioning apparatus 116.

In step S302, the position obtaining apparatus 110 transmits the vehicle position obtained in step S301, the date and time of the obtainment of the vehicle position (hereinafter referred to as travel date and time), and user identification information of the driver 103 stored in the storage apparatus 112 to the image management apparatus 130, and the image management apparatus 130 receives them. The user identification information is information for uniquely identifying a user of the image providing system 100 (e.g., the driver 103), and is provided to each user by an administrator of the image providing system 100. For example, when the user installs an application program for executing the processing of FIG. 3 on his/her own position obtaining apparatus 110, user identification information of this user is stored into the storage apparatus 112.

In step S303, the image management apparatus 130 stores the vehicle position, the travel date and time, and the user identification information that were received in step S302 into the storage apparatus 132 in association with one another. Thereafter, the image management apparatus 130 may transmit the vehicle position received in step S302 to the shooting apparatuses 120. In response to the reception of the vehicle position, the shooting apparatus 120b may move so as to shoot the position at which the vehicle is present. Also, in response to the reception of the vehicle position, the shooting apparatus 120c may notify the photographer 104 of the vehicle position. This enables the photographer 104 to shoot the vehicle.

The processing of the position obtaining apparatus 110 (step S301 and step S302) may be started by, for example, the driver 103 inputting a start instruction through the application program, then executed repeatedly (e.g., every second), and ended by the driver 103 inputting an end instruction. Alternatively, the processing of the position obtaining apparatus 110 may be automatically executed repeatedly while the user is travelling through a specific section (e.g., a tourist-attracting section that is set in the application program). Through the repetition of the processing of FIG. 3, vehicle positions on respective dates and times are stored into the storage apparatus 132 of the image management apparatus 130 together with identification information of the driver 103.

In the above-described example, the position obtaining apparatus 110 transmits the travel date and time to the image management apparatus 130 in step S302. Alternatively, the image management apparatus 130 may consider the date and time on which the image management apparatus 130 received a vehicle position as the travel date and time, and store the same into the storage apparatus 132. Furthermore, instead of transmitting a vehicle position to the image management apparatus 130 each time the vehicle position is obtained, the position obtaining apparatus 110 may store the same into its own storage apparatus 112, and transmit a plurality of sets of the vehicle position and the travel date and time collectively to the image management apparatus 130 (e.g., when instructed by the driver 103 to end a position obtaining operation, or upon completion of travelling through a specific section).

Figure 4:
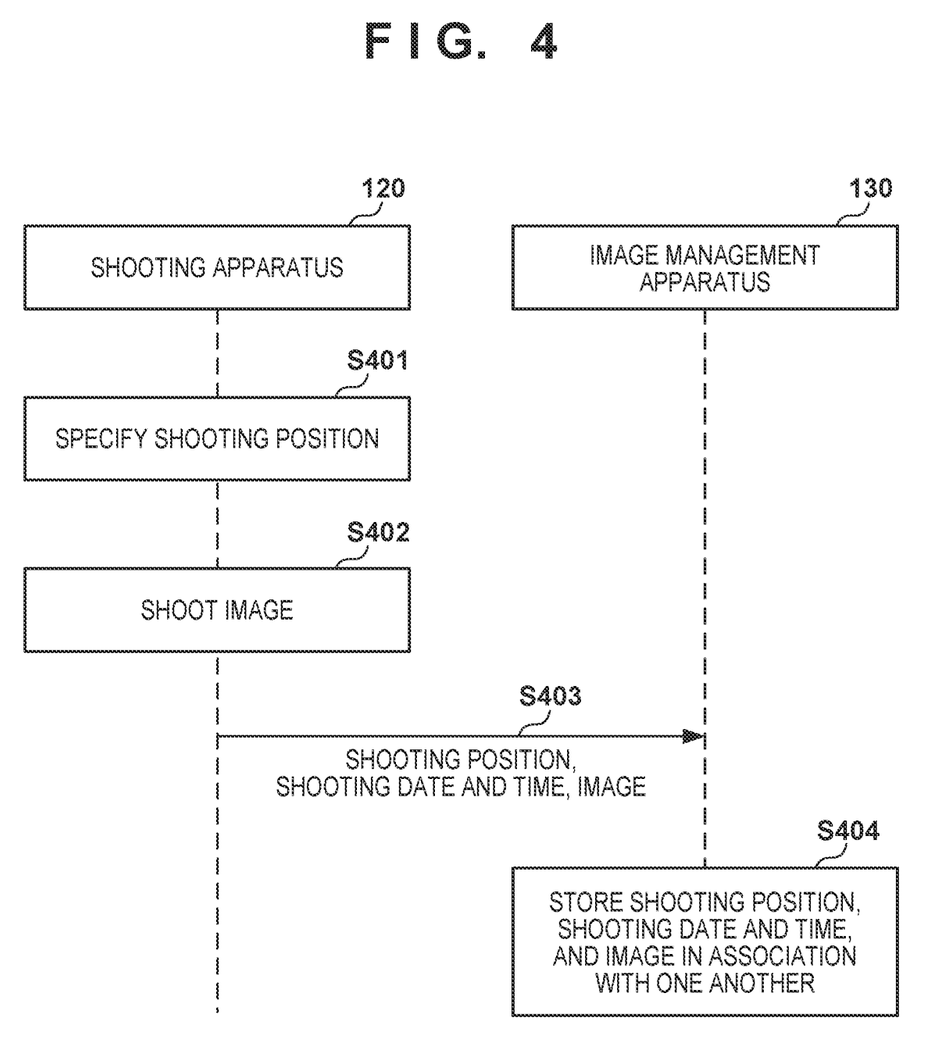
FIG. 4 is a diagram for describing one example of processing for registering an image according to embodiments of the present invention.

With reference to FIG. 4, a description is now given of one example of processing for registering an image. This processing is executed through collaboration between the shooting apparatus 120 and the image management apparatus 130. Processing in the shooting apparatus 120 is performed by the processing apparatus 121 reading out a program stored in the storage apparatus 122 and executing instructions included in this program. Processing in the image management apparatus 130 is performed by the processing apparatus 131 reading out a program stored in the storage apparatus 132 and executing instructions included in this program.

In step S401, the shooting apparatus 120 specifies a shooting position of the shooting apparatus 120 based on a geographical position of the shooting apparatus 120 measured by the positioning apparatus 126 and an orientation measured by the orientation measuring sensor 128. As stated earlier, the shooting position may be specified based on input from the photographer 104. In step S402, the shooting apparatus 120 shoots an image using the image sensor 127. This image may be a still image or may be a moving image (e.g., a moving image with a duration of approximately 10 seconds).

In step S403, the shooting apparatus 120 transmits the shooting position specified in step S401, the image shot in step S402, and the date and time of the shooting of the image (hereinafter referred to as shooting date and time) to the image management apparatus 130, and the image management apparatus 130 receives them. In step S404, the image management apparatus 130 stores the shooting position, the shooting date and time, and the image that were received in step S403 into the storage apparatus 132 in association with one another.

The processing of the shooting apparatus 120 (step S401 to step S403) may be started by, for example, activation of the shooting apparatus 120, then executed repeatedly (e.g., every second), and ended by shutdown of the shooting apparatus 120. Alternatively, the processing of the shooting apparatus 120 may be performed in accordance with an instruction from the photographer 104. Through this processing, images at respective shooting positions are stored into the storage apparatus 132 of the image management apparatus 130 together with the shooting positions.

In the above-described example, the shooting apparatus 120 transmits the shooting date and time to the image management apparatus 130 in step S403. Alternatively, the image management apparatus 130 may consider the date and time on which the image management apparatus 130 received a shooting position and an image as the shooting date and time, and store the same into the storage apparatus 132. Furthermore, instead of transmitting an image to the image management apparatus 130 each time the image is shot, the shooting apparatus 120 may store the same into its own storage apparatus 112, and transmit a plurality of sets of the shooting position, the shooting date and time, and the image collectively to the image management apparatus 130 (e.g., when instructed by the photographer 104, when instructed remotely by the image management apparatus 130, when a certain time period (e.g., one hour) has elapsed, and so forth).

Figure 5:
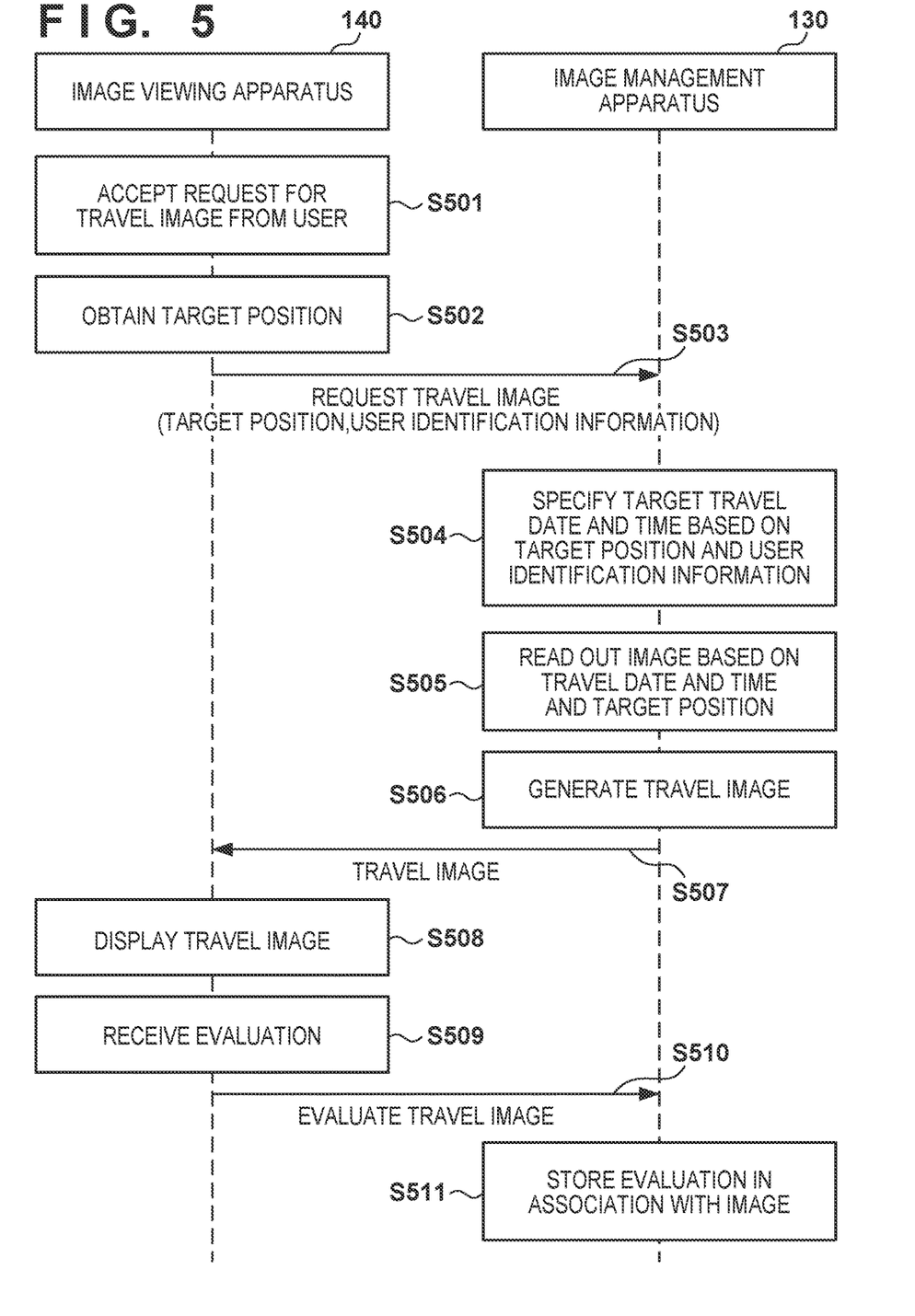
FIG. 5 is a diagram for describing one example of processing for generating and displaying a travel image according to embodiments of the present invention.

With reference to FIG. 5, a description is now given of one example of processing for generating and displaying a travel image. This processing is executed through collaboration between the image viewing apparatus 140 and the image management apparatus 130. Processing in the image viewing apparatus 140 is performed by the processing apparatus 141 reading out a program stored in the storage apparatus 142 and executing instructions included in this program. Processing in the image management apparatus 130 is performed by the processing apparatus 131 reading out a program stored in the storage apparatus 132 and executing instructions included in this program.

In step S501, the image viewing apparatus 140 accepts a request from a user (e.g., the driver 103) to display a travel image. This request includes user identification information of the user to whom the travel image is to be displayed. When the user wishes to display a travel image of a vehicle that he/she is driving, the user includes his/her own user identification information into the request. When the user wishes to display a travel image of a vehicle that another person is driving, the user includes user identification information of another person into the request.

In step S502, the image viewing apparatus 140 obtains a geographical position for which the travel image is to be generated. This geographical position is referred to as a target position. The target position may be a position that is selected by the user based on a map displayed on the display apparatus 144, may be a current position of the image viewing apparatus 140 based on the result of measurement by the positioning apparatus 146, may be a position that is indicated by an address input by the user, or may be a position that is specified based on a scene shot by the image sensor 147 of the image viewing apparatus 140.

In step S503, the image viewing apparatus 140 transmits a request including the user identification information received in step S501 and the target position obtained in step S502 to the image management apparatus 130, and the image management apparatus 130 receives the same.

In step S504, based on the target position and the user identification information included in the request, the image management apparatus 130 specifies the travel date and time on which the user for whom the generation is performed was travelling through the target position in the past. The travel date and time are specified by searching for the information stored in step 303 of FIG. 3 using the target position (vehicle position) and the user identification information as keys. As the user may travel the same geographical position multiple times, multiple travel dates and times may be specified.

In step S505, based on the target position received in step S503 and the travel date and time specified in step S505, the image management apparatus 130 reads out, from the storage apparatus 132, an image of the vehicle at the time of travelling of the user for whom the generation is performed through the target position in the past. The image of the vehicle is read out by searching for the information stored in step 404 of FIG. 4 using the target position (shooting position) and the travel date and time (shooting date and time) as keys. As multiple shooting apparatuses 120 may shoot a vehicle of one driver on the same date and time, the number of this image may be more than one. Furthermore, there may be a case where the user was not shot at the target position; in this case, the target image is not found. Here, the past means time before the current time, and an image that can be viewed on the same day after getting off the vehicle is included among images of the past.

In step S506, the image management apparatus 130 generates a travel image of the target driver 103. The travel image includes a scene of the target position and travel data at the time of travelling of the vehicle 101 through the target position in the past. The travel data may be an image of the vehicle 101 and the driver 103 at the time of travelling of the vehicle 101 through the target position in the past, may be a travel path at the time of travelling of the vehicle 101 through the target position in the past, or may be a combination of them. When there are a plurality of specified images, the travel image may be generated with respect to one of them, or the travel image may be generated with respect to each of them. The image management apparatus 130 may use the image that has been read out as is as the travel image, or may process the image that has been read out and use the processed image as the travel image.

In step S507, the image management apparatus 130 transmits the travel image generated in step S506 to the image viewing apparatus 140, and the image viewing apparatus 140 receives the same. In step S508, the image viewing apparatus 140 displays the travel image on the display apparatus 144.

In step S509, the image viewing apparatus 140 obtains an evaluation on the travel image from the user. This evaluation may be in two stages of "good" or "bad", or may be an evaluation in three stages or more. In step S510, the image viewing apparatus 140 transmits the evaluation accepted in step S509 to the image management apparatus 130, and the image management apparatus 130 receives the same. In step S511, the image management apparatus 130 stores the evaluation on the travel image into the storage apparatus 132 in association with the image that was used in the generation of this travel image.

The image management apparatus 130 may change the operations of the shooting apparatus 120 based on evaluations stored in the storage apparatus 132. For example, when the evaluation on an image obtained by shooting the vehicle from the front is higher than the evaluation on an image obtained by shooting the vehicle from the back, the image management apparatus 130 may control the shooting apparatus 120 to perform shooting more from the front. In this way, the more the image management apparatus 130 generates travel data, the higher the possibility that travel data suited for the taste of the user is generated.

In the above-described step S501, the user may include user identification information of a plurality of users into the request to display the travel image. In this case, the image management apparatus 130 reads out images at the respective times of travelling of a plurality of vehicles of the plurality of users through the target position on different dates and times in the past in step S505, and generates a travel image that includes a scene of the target position and travel data of the respective vehicles in step S506.

In the above-described step S501, the user may include an instruction for displaying a travel image of a virtual vehicle into the request to display the travel image. The travel image of the virtual vehicle is, for example, a travel image including travel data that has been electronically generated by the image management apparatus 130 (e.g., data indicating ideal travelling). In this case, the image management apparatus 130 reads out an image of the target position in step S505, and generates a travel image that includes a scene of the target position and the travel data of the virtual vehicle in step S506.

In the operations of FIG. 5, S506 may be performed by image viewing apparatus 140. In this case, as the image viewing apparatus 140 generates the travel image, it may be referred to as an image generating apparatus. The image viewing apparatus 140 obtains the target position in step S502, and obtains an image that has been read out by the image management apparatus 130 in step S505 by receiving this image prior to step S506. In generating the travel image, the image viewing apparatus 140 may use a scene that has been shot in real time by the image viewing apparatus 140 instead of using a scene of the target position included in an image that was shot in the past.

Figure 6A:
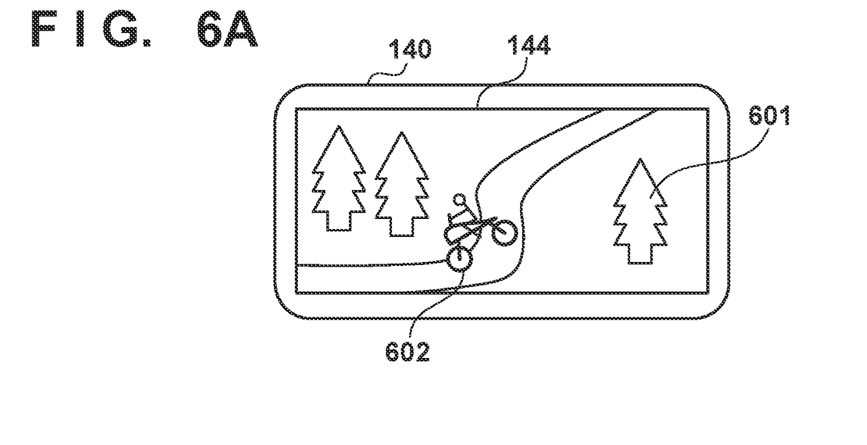
FIG. 6A is a diagram for describing exemplary display of a travel image according to embodiments of the present invention.
Figure 6B:
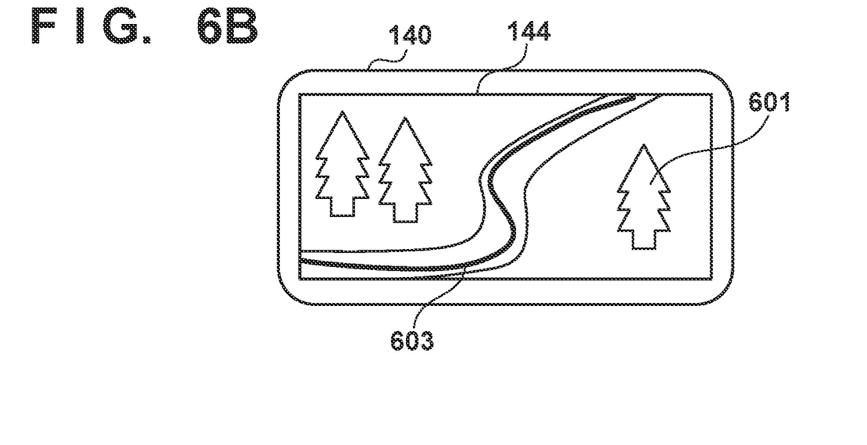
FIG. 6B is a diagram for describing exemplary display of a travel image according to embodiments of the present invention.
Figure 6C:
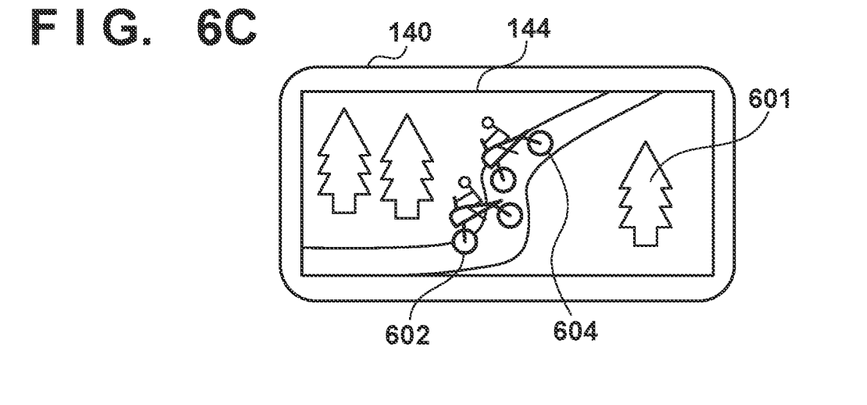
FIG. 6C is a diagram for describing exemplary display of a travel image according to embodiments of the present invention.

With reference to FIGS. 6A to 6C, a description is now given of examples of the travel image displayed in step S508. In the example of FIG. 6A, a travel image that includes a scene 601 of the target position and an image 602 of the vehicle and the driver at the time of travelling of the vehicle through the target position in the past is displayed on the display apparatus 144. In the example of FIG. 6B, a travel image that includes the scene 601 of the target position and a travel path 603 at the time of travelling of the vehicle through the target position in the past is displayed on the display apparatus 144. In the example of FIG. 6C, a travel image that includes the scene 601 of the target position, the image 602 of the vehicle and the driver at the time of travelling of the vehicle through the target position in the past, and an image 604 of another vehicle and driver at the time of travelling of another vehicle through the target position on another date and time is displayed on the display apparatus 144.

Figure 7:
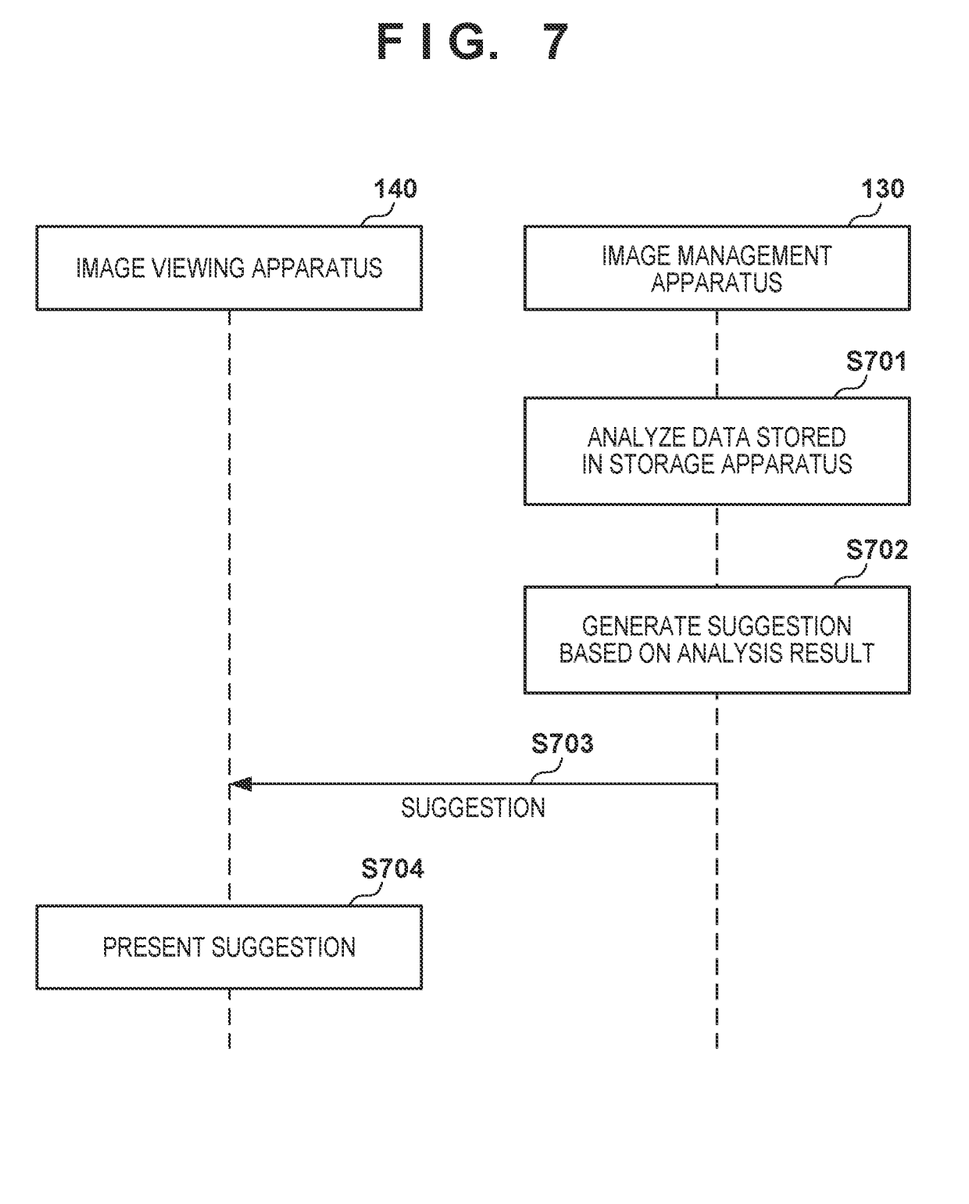
FIG. 7 is a diagram for describing one example of processing for providing a suggestion according to embodiments of the present invention.

With reference to FIG. 7, a description is now given of one example of processing for providing a suggestion. This processing is executed through collaboration between the image viewing apparatus 140 and the image management apparatus 130. Processing in the image viewing apparatus 140 is performed by the processing apparatus 141 reading out a program stored in the storage apparatus 142 and executing instructions included in this program. Processing in the image management apparatus 130 is performed by the processing apparatus 131 reading out a program stored in the storage apparatus 132 and executing instructions included in this program.

In step S701, the image management apparatus 130 analyzes data stored in the storage apparatus 132. As stated earlier, the storage apparatus 132 stores images of a travelling vehicle. For example, when a vehicle of a certain user includes many alterations from a genuine vehicle, the image management apparatus 130 determines that this user likes modifications. When a certain user owns a plurality of vehicles, it is determined that this user spends a large budget on vehicles. A user with a high travelling speed is determined to have a tendency to enjoy running. A user who travels in a specific season (e.g., a spring or a fall) is determined to be a seasonal user.

In step S702, the image management apparatus 130 generates a suggestion based on the analysis result. For example, the image management apparatus 130 generates a suggestion that encourages more modifications to a user who likes modifications. Purchase of a new model is suggested to a user who spends a large budget on vehicles. A technique for more skillful travelling is suggested to a user who tends to enjoy running. Season-related events are suggested to a seasonal user. To a user of a specific type of motorbike, an area in which many motorbikes of this type appear is suggested.

In step S703, the image management apparatus 130 transmits the suggestion generated in step S702 to the image viewing apparatus 140, and the image viewing apparatus 140 receives the same. In step S704, the image viewing apparatus 140 displays the suggestion on the display apparatus 144.

Thereafter, the image management apparatus 130 may obtain an evaluation on the suggestion from the user, and improve the quality of the suggestion.

In FIG. 3 to FIG. 5 and FIG. 7 described above, processing is performed by the processing apparatus of each apparatus in the image providing system 100 executing a program. Alternatively, each apparatus may include a dedicated circuit (e.g., an ASIC) for executing a part or all of the above-described processing.

SUMMARY OF EMBODIMENTS

Configuration 1

An image generating apparatus (130), comprising: a first obtaining unit (131, S503) configured to obtain a geographical position for which an image is to be generated; a second obtaining unit (131, S505) configured to obtain, based on the geographical position, travel data at a time of travelling of a vehicle (101) through the geographical position in a past; and a generating unit (131, S506) configure to generate a travel image including a scene (601) of the geographical position and the travel data.

According to this configuration, the specification of an image of a vehicle that was shot at a specific geographical position is facilitated.

Configuration 2

The image generating apparatus according to configuration 1, wherein the travel data includes at least one of an image (602, 604) of the vehicle and a driver (103) at the time of travelling of the vehicle through the geographical position in the past, and a travel path (603) at the time of travelling of the vehicle through the geographical position in the past.

This configuration makes it possible to check the image of the vehicle and the driver, as well as the travel path, in the past.

Configuration 3

The image generating apparatus according to configuration 2, wherein the image of the vehicle and the driver is an image that has been shot by at least one of a shooting apparatus (120a) fixed at a fixed position and a shooting apparatus (120b, 120d) mounted on a mobile object (101, 105).

This configuration makes it possible to provide travel information from multiple standpoints, thereby leading to an improvement in a future riding technique of a user.

Configuration 4

The image generating apparatus according to any one of configurations 1 to 3, wherein the image generating apparatus further comprises a unit configured to obtain user identification information for identifying a user, and the second obtaining unit includes obtainment of travel data related to the user based on the geographical position and the user identification information.

This configuration makes it possible to generate a travel image of a specific user.

Configuration 5

The image generating apparatus according to any one of configurations 1 to 4, wherein the second obtaining unit obtains travel data of each of a plurality of vehicles at times of travelling of the plurality of vehicles through the geographical position on different dates and times in the past, and the generating unit generates a travel image including the scene of the geographical position and the travel data of each of the plurality of vehicles.

This configuration makes it possible to generate a travel image that enables travelling of a plurality of users to be checked at a time.

Configuration 6

The image generating apparatus according to any one of configurations 1 to 5, wherein the geographical position for which the image is to be generated is specified based on at least one of a map, an address, a scene shot by a shooting apparatus, and a result of positioning performed by a positioning apparatus.

This configuration makes it possible to specify the geographical position in various ways.

Configuration 7

The image generating apparatus according to any one of configurations 1 to 6, wherein the generating unit further generates a travel image including the scene of the geographical position and travel data of a virtual vehicle.

This configuration makes it possible to generate a travel image that is not bound by travelling of an actual vehicle.

Configuration 8

The image generating apparatus according to any one of configurations 1 to 6, wherein the generation of the travel image includes use of a scene that has been shot in real time as the scene of the geographical position.

This configuration makes it possible to generate a travel image with respect to a current scene Configuration 9

A method of generating an image, the method comprising: obtaining a geographical position for which an image is to be generated (S503); obtaining, based on the geographical position, travel data at a time of travelling of a vehicle (101) through the geographical position in a past (S505); and generating a travel image including a scene (601) of the geographical position and the travel data (S506).

According to this configuration, the specification of an image of a vehicle that was shot at a specific geographical position is facilitated.

Configuration 10

The method according to configuration 9, wherein the travel data includes at least one of an image (602, 604) of the vehicle and a driver (103) at the time of travelling of the vehicle through the geographical position in the past, and a travel path (603) at the time of travelling of the vehicle through the geographical position in the past.

This configuration makes it possible to check the image of the vehicle and the driver, as well as the travel path, in the past.

Configuration 11

A program comprising an instruction for, when the program is executed by one or more processors (131), causing the one or more processors to: obtain a geographical position for which an image is to be generated (S503); obtain, based on the geographical position, travel data at a time of travelling of a vehicle through the geographical position in a past (S505); and generate a travel image including a scene of the geographical position and the travel data (S506).

According to this configuration, the specification of an image of a vehicle that was shot at a specific geographical position is facilitated.

Configuration 12

The program according to configuration 11, wherein the travel data includes at least one of an image (602, 604) of the vehicle and a driver (103) at the time of travelling of the vehicle through the geographical position in the past, and a travel path (603) at the time of travelling of the vehicle through the geographical position in the past.

This configuration makes it possible to check the image of the vehicle and the driver, as well as the travel path, in the past.

The present invention is not limited to the above embodiments and various changes and modifications can be made within the spirit and scope of the present invention. Therefore, to apprise the public of the scope of the present invention, the following claims are made.

The invention claimed is:

1. An image generating apparatus, comprising:
   a first obtaining unit configured to obtain a geographical position for which an image is to be generated;
   a second unit configured to obtain user identification information for identifying a user;
   a third obtaining unit configured to specify, based on the geographical position and the user identification information, a date and time when a vehicle related to the user traveled through the geographical position in a past and obtain travel data of the vehicle at the date and time; and
   a generating unit configured to generate a travel image including a scene of the geographical position and the travel data.

2. The image generating apparatus according to claim 1, wherein the travel data includes at least one of an image of the vehicle and a driver at the time of travelling of the vehicle through the geographical position in the past, and a travel path at the time of travelling of the vehicle through the geographical position in the past.

3. The image generating apparatus according to claim 2, wherein the image of the vehicle and the driver is an image that has been shot by at least one of a shooting apparatus fixed at a fixed position and a shooting apparatus mounted on a mobile object.

4. The image generating apparatus according to claim 1, wherein
   the second obtaining unit obtains travel data of each of a plurality of vehicles at times of travelling of the plurality of vehicles through the geographical position on different dates and times in the past, and the generating unit generates a travel image including the scene of the geographical position and the travel data of each of the plurality of vehicles.

5. The image generating apparatus according to claim 1, wherein the geographical position for which the image is to be generated is specified based on at least one of a map, an address, a scene shot by a shooting apparatus, and a result of positioning performed by a positioning apparatus.

6. The image generating apparatus according to claim 1, wherein the generation of the travel image includes use of a scene that has been shot in real time as the scene of the geographical position.

7. An image generating apparatus, comprising:
a first obtaining unit configured to obtain a geographical position for which an image is to be generated;
a second obtaining unit configured to specify a date and time when a target vehicle traveled through the geographical position in a past and obtain travel data of the vehicle at the date and time; and
a generating unit configured to generate a travel image including a scene of the geographical position, the travel data of the vehicle, and travel data of a virtual vehicle.

8. A method of generating an image, the method comprising:
obtaining a geographical position for which an image is to be generated;
obtaining user identification information for identifying a user;
specifying, based on the geographical position and the user identification information, a date and time when a vehicle related to the user traveled through the geographical position in a past and obtaining travel data of the vehicle at the date and time; and
generating a travel image including a scene of the geographical position and the travel data.

9. The method according to claim 8, wherein the travel data includes at least one of an image of the vehicle and a driver at the time of travelling of the vehicle through the geographical position in the past, and a travel path at the time of travelling of the vehicle through the geographical position in the past.

10. A non-transitory storage medium comprising a program comprising an instruction for, when the program is executed by one or more processors, causing the one or more processors to:
obtain a geographical position for which an image is to be generated;
obtain user identification information for identifying a user;
specify, based on the geographical position and the user identification information, a date and time when a vehicle related to the user traveled through the geographical position in a past and obtain travel data of the vehicle at the date and time; and
generate a travel image including a scene of the geographical position and the travel data.

11. The storage medium according to claim 10, wherein the travel data includes at least one of an image of the vehicle and a driver at the time of travelling of the vehicle through the geographical position in the past, and a travel path at the time of travelling of the vehicle through the geographical position in the past.

12. A method of generating an image, the method comprising:
obtaining a geographical position for which an image is to be generated;
specifying a date and time when a target vehicle traveled through the geographical position in a past and obtaining travel data of the vehicle at the date and time; and
generating a travel image including a scene of the geographical position, the travel data of the vehicle, and travel data of a virtual vehicle.

13. A non-transitory storage medium comprising a program comprising an instruction for, when the program is executed by one or more processors, causing the one or more processors to:
obtain a geographical position for which an image is to be generated;
specify a date and time when a target vehicle traveled through the geographical position in a past and obtain travel data of the vehicle at the date and time; and
generate a travel image including a scene of the geographical position, the travel data of the vehicle, and travel data of a virtual vehicle.

* * * * *